UNITED STATES PATENT OFFICE 1,976,886

PREPARATION OF WETTING AGENTS FOR USE IN ALKALIZING LYES

Heinrich Lier, Basel, Switzerland, assignor to the firm Chemical Works formerly Sandoz, Basel, Switzerland No Drawing. Application May 13, 1931, Serial No. 537,225. In Germany May 27, 1930

3 Claims. (Cl. 8—20)

I have found that very valuable wetting-out preparations which possess a great efficacy when being used in alkaline solutions such as mercerizing lyes can be prepared by mixing phenols, such as phenol, cresols, xylenols, chlorophenols or mixtures thereof, with monoacylated ethylenediamines, their homologues and substitution products. Such compounds are for instance the monooleylethylenediamine, its substitution products such as monooleyldiethylethylenediamine and their alkylated derivatives, whereby all these compounds may be used together with phenols in form of the free bases or their salts.

The mixtures thus prepared are more or less colored solutions easily soluble in alkaline lyes, but almost insoluble in water.

When added to alkaline lyes, these mixtures impart to them very durable wetting-out properties, which are not affected by the temperatures generally used in mercerizing processes.

In order to obtain the desired effect, the above described mixtures are added in suitable quantities to the alkaline lyes of various concentrations or the mixtures are generated therein by adding their constituents under good stirring.

According to the present invention it is possible to mercerize dry raw sized cotton fibres very rapidly and to obtain a very high lustre in a single treatment.

The following examples, without being limitative, illustrate the new process, the parts being by weight.

Example 1

To 100 parts of a caustic soda solution of 32° Bé. are added 1.17 parts of a mixture consisting of 90% of technical tar cresol mixture and of 10% of diethylaminoethyloleylamide of the formula:

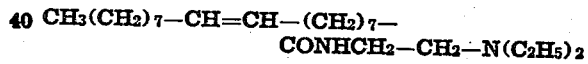

$CH_3(CH_2)_7-CH=CH-(CH_2)_7-CONHCH_2-CH_2-N(C_2H_5)_2$

The wetting-out action of the solution thus obtained is so great that raw dry cotton tissues and yarns are immediately impregnated and shrink very rapidly.

Example 2

To 130 parts of a mercerizing lye of 35° Bé. is added 1 part of a 10% aqueous solution of the hydrochloric acid salt of diethylaminoethyl-oleylamide, whereby the free base separates from the solution and is finely dispersed therein by means of a further addition under good stirring of 1.33 parts of technical raw cresol mixture. The clear lye thus obtained is then used for mercerizing dry, raw cotton tissues as it possesses excellent wetting-out properties and allows to obtain equal mercerizing effect with a great lustre.

Instead of technical raw cresol mixture mixtures containing chlorophenols and cresols may be used.

A comparative lye containing only 1 part of the above cited diethylaminoethyloleylamide, practically cannot be used for the same purpose as it nearly does not impregnate raw cotton and is troubled by the separated base.

What I claim is:

1. A process for increasing the wetting-out power of alkaline lyes, which comprises mixing the lyes with mixtures of phenols and diethylaminoethyloleylamide.

2. A process for increasing the wetting-out power of alkaline lyes, which comprises mixing the lyes with a mixture of a technical tar cresol mixture and diethylaminoethyloleylamide.

3. A process for increasing the wetting-out power of alkaline lyes, which comprises mixing the lyes with mixtures of chlorophenols, cresols and diethylaminoethyloleylamide.

HEINRICH LIER.